(12) United States Patent
Poplack et al.

(10) Patent No.: US 11,449,337 B1
(45) Date of Patent: Sep. 20, 2022

(54) PSEUDORANDOM KEEPHOT INSTRUCTIONS TO MITIGATE LARGE LOAD STEPS DURING HARDWARE EMULATION

(71) Applicant: CADENCE DESIGN SYSTEMS, INC., San Jose, CA (US)

(72) Inventors: Mitchell Poplack, San Jose, CA (US); Yuhei Hayashi, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 278 days.

(21) Appl. No.: 16/721,791

(22) Filed: Dec. 19, 2019

(51) Int. Cl.
*G06F 9/30* (2018.01)
*G06F 9/455* (2018.01)

(52) U.S. Cl.
CPC ...... *G06F 9/30083* (2013.01); *G06F 9/30134* (2013.01); *G06F 9/455* (2013.01)

(58) Field of Classification Search
CPC ... G06F 9/30076; G06F 9/30083; G06F 9/455
See application file for complete search history.

(56) References Cited

U.S. PATENT DOCUMENTS

| | | | |
|---|---|---|---|
| 6,173,393 B1 * | 1/2001 | Palanca | G06F 9/30032 712/22 |
| 6,983,389 B1 * | 1/2006 | Filippo | G06F 9/3836 713/324 |
| 8,160,862 B1 * | 4/2012 | Poplack | G06F 1/3206 703/23 |
| 2007/0277130 A1 * | 11/2007 | Lavelle | G01R 31/318314 716/107 |

* cited by examiner

*Primary Examiner* — Jacob Petranek
(74) *Attorney, Agent, or Firm* — Foley & Lardner LLP (57) ABSTRACT

A pseudorandom logic circuit may be embedded as a hardware within an emulation system, which may generate pseudorandom keephot instructions. A masking logic may mask out portions in each pseudorandom keephot instruction, which may change state elements during execution. A cluster of emulation processors may execute masked pseudorandom keephot instructions to consume power when not executing mission instructions. The cluster of emulation processors may run keephot cycles, during which the cluster of emulation processors may execute the pseudorandom keephot instructions causing the cluster of emulation processors to continue consuming a roughly constant amount of power, either at a same or different voltage level, but supposed outputs of the pseudorandom keephot instructions may have no impact upon inputs and outputs generated during mission cycles.

20 Claims, 5 Drawing Sheets

PSEUDORANDOM KEEPHOT INSTRUCTIONS TO MITIGATE LARGE LOAD STEPS DURING HARDWARE EMULATION

TECHNICAL FIELD

This application is generally directed towards emulating integrated circuit design, and more specifically towards mitigating large load steps during hardware emulation utilizing pseudorandom keephot instructions.

BACKGROUND

Modern semiconductor based integrated circuits are incredibly complex and contain millions of circuit devices, such as transistors, and millions of interconnections between the circuit devices. Designing such complex integrated circuits cannot be accomplished manually, and circuit designers use computer-based electronic design automation tools for synthesis, debugging, and functional verification of the integrated circuits. A significant function of the electronic design automation tools is an emulation of a logical system (e.g., an integrated circuit design) to perform pre-silicon functional verification, firmware and software development, and post-silicon debug. To achieve this, a typical processor-based emulation system includes several application specific integrated circuits all working together to execute a program generated by an emulation compiler generated from the integrated circuit design. The compiled program code models a design under test that is a logical representation of the integrated circuit design running on the emulation system.

A common method of the integrated circuit design verification is to use processor-based hardware emulators to emulate the integrated circuit design prior to physically manufacturing a hardware of the integrated circuit design. These processor-based hardware emulators may sequentially evaluate combinatorial logic levels, starting at inputs and proceeding to outputs. Each pass through an entire set of logic levels and instructions known as a mission cycle (e.g., an emulation cycle), and an evaluation of each individual logic level is known as an emulation step.

Conventional processor-based hardware emulators may include identical emulation processors. The emulation processors may be arranged into groups of emulation processors known as clusters. In a conventional hardware emulator, each emulation processor may perform an identical set of functions, such as retrieving data from a memory, evaluating the data, and writing a processed result back into either a same or a different memory. The emulation processor may typically address the memory via an instruction word. The instruction word may be stored in an instruction memory. The instruction word may contain a read address for the data to be evaluated and a Boolean function table that instructs the emulation processor on how to evaluate the data. The emulation processor may store produced result back to the same memory location as indicated by the instruction address.

Each emulation processor may be configured to operate in a lock step mode. During the lock step mode, each emulation processor may execute a same instruction number at a same time. In the currently utilized processor-based hardware emulator architecture, a single emulation chip may include thousands of emulation processors, which means that there may be millions of emulation processors, across hundreds of emulation chips, each executing mission instructions (e.g. emulation instructions) at the same time. The synchronous execution by many, if not all, of the emulation processors and static scheduling of the mission instructions is not conducive to power regulation, because the emulation system goes from idle (little to no power consumption) power to maximum power consumption, in one execution step. Such an event in the emulation system, when the power consumption usage of the emulation system goes from idle power to maximum power from one step to the next, is called a load step.

The emulation system may include measures for establishing a power delivery network to components of the emulation system, such as the emulation processors. The power delivery network may include a voltage regulator module that generates at least one predetermined supply voltage level. When large load steps occur in the emulation system, for example, when the current goes from a low value to a high value, particularly in high-power applications, the voltage regulator module, power distribution conductors, and several different scales of capacitances of the emulation system are not able to compensate, and it becomes difficult to hold a constant voltage. For instance, the capacitance in the emulation chip attempts to hold voltage steady at a scale of frequencies above roughly 300 MHz, but is limited in value depending on how much charge the capacitance can supply. The capacitance on an emulation board may react slowly because the capacitance effectiveness is limited by an inductance of pathways, which may resist changes in the current at high frequencies. Also, there is not sufficient capacitance on the emulation chip and the emulation board to supply charge when circuits of the emulation system architecture go from a very low power to a very high power in a short amount of time. In the emulation system, the constant voltage is required for optimal emulation chip function, since most of the switching in the emulation chip is synchronized and behavior of transistors within the integrated circuit design cannot be analyzed when the voltage is not held at a pre-determined constant value or at least within a pre-determined range.

The emulation system may overcome the voltage fluctuation problem with the voltage regulator module configured to regulate the voltage and keep the voltage value at a pre-determined constant value whenever there is a change in the voltage. The voltage regulator module may continuously monitor the voltage and subsequently raise or lower the voltage value to a target set point (or within a target range) when there is any deviation of the voltage value from the target set point (or from the target range). For example, if the pre-determined voltage value is set in the emulation system, and the current is increased from a low value to a high value, an IR drop (voltage drop) may occur, which may result in increase or decrease of the voltage value, and thus the voltage value may change from the target value. This change in the voltage value may occur because there is more voltage drop during transmission when more current is being drawn. Also, the voltage value at the voltage regulator module has to be higher so that the voltage value at the emulation chip remains at the pre-determined voltage value.

The IR drop is the voltage reduction that occurs in the power delivery networks in the emulation system. The IR drop may be static or dynamic, and typically results from an existence of non-ideal elements, such as, a resistance within the power and ground supply wiring, and the capacitance between them. There may be the IR drop of an emulation chip package. There may also be a power distribution network inside the emulation chip that may experience some IR drop. The voltage regulator module is configured to keep the pre-determined voltage value that has been programmed into the memory, or set by a reference feedback network, etc., of the voltage regulator module at a constant value, while taking into consideration the IR drop. In operation, while the current being drawn into the emulation system is increased from a lower value to a higher value, the voltage regulator module is compensating the amount of the voltage value in the emulation system, e.g., pushing out more power to keep the voltage value at a target level regardless of the change of a load of the current. In some cases, during the period before the voltage regulator module actually adjusts the power, the emulation chip is also not operating, because, in such cases, the emulation chip is designed to function only when the voltage value is within a certain range and the voltage value at transistors is below the specified voltage value. In some cases, when the voltage value is out of specification, the transistors do not switch as fast as desired, which may cause timing violations for switching of transistors and/or any number of logical errors.

To prevent the timing violations and logical errors caused by large load steps within the emulation system, a software-based feature may be implemented, which may cause generation and execution of garbage commands to continuously consume power. Although the use of the software-based feature is able to somewhat prevent the large load steps, however the software-based feature have some limitations. For instance, the implementation of the software-based feature may cause a small gap between one mission cycle and a subsequent mission cycle. The presence of the small gap between the two mission cycles may mean that the power has to be dropped for a short period of time during the gap. Each time the power may be dropped due to the gap, there is still a small load step. Also, the implementation of the software-based feature may need a lot of support by a firmware and a compiler of the emulation system to realize complicated procedures and execute the garbage instructions. As the software-based feature is not able to completely prevent the occurrence of the load steps, the use of such resources to set up and implement the software-based feature is not the efficient use of limited system resources.

SUMMARY

What is therefore desired are emulation systems and methods supporting faster, more flexible features and solutions to continuously consume power, even when mission instructions are not being executed by emulation processors. Consuming power while not executing mission instructions can mitigate a power-load drop and power-load rise, when mission cycles may end or begin, such that the amount of power consumption does not drop too severely between the mission cycles.

A hardware logic circuit, such as a pseudorandom logic circuit, may be embedded within an emulation system, which may generate one or more pseudorandom keephot instructions. A masking logic associated with the hardware logic circuit may mask out one or more portions in each of the one or more pseudorandom keephot instructions, which may change state elements during execution of the one or more pseudorandom keephot instructions. A cluster of emulation processors may execute the one or more pseudorandom keephot instructions to consume power when the cluster of emulation processors are not executing one or more mission instructions. For instance, the cluster of emulation processors may run one or more keephot cycles, during which the cluster of emulation processors may execute the one or more pseudorandom keephot instructions causing the cluster of emulation processors to continue consuming a roughly constant amount of power, either at a same or different voltage level, but supposed outputs of the one or more pseudorandom keephot instructions may have no impact upon inputs and outputs generated during one or more mission cycles.

In one embodiment, an emulation system may include a cluster of emulation processors; a hardware logic circuit electrically coupled to the cluster of emulation processors and configured to generate a plurality of pseudorandom keephot instructions; and the cluster of emulation processors configured to execute the plurality of pseudorandom keephot instructions to consume power while not executing mission instructions.

In another embodiment, a method for mitigating large load steps during emulation may include generating, by a hardware logic circuit electrically coupled to a cluster of emulation processors of a hardware emulator, a plurality of pseudorandom keephot instructions; and executing, by the cluster of emulation processors, the plurality of pseudorandom keephot instructions to consume power while not executing mission instructions.

In yet another embodiment, an emulation system may include a control store comprising a plurality of mission instructions; a cluster of emulation processors associated with the control store and configured to execute the plurality of mission instructions; a random instruction generator associated with the control store and the cluster of emulation processors, wherein the random instruction generator is configured to randomly select one or more mission instructions from the plurality of mission instructions and mask the one or more mission instructions to generate one or more keephot instructions; and the cluster of emulation processors configured to execute the one or more keephot instructions to consume power while not executing the plurality of mission instructions.

BRIEF DESCRIPTION OF THE DRAWINGS

The accompanying drawings constitute a part of this specification and illustrate an embodiment of the subject matter described herein.

DETAILED DESCRIPTION

An emulation system may include integrated circuits, such as chips (e.g., emulation chips). The chips may include multiple emulation processors. The emulation processors may be organized on an emulation chip into one or more emulation processor clusters where each emulation processor cluster may include a set of one or more emulation processors. In a conventional operation of the emulation system, when a mission cycle is started, the emulation system shifts from an idle state, during which no emulation processor clusters are executing mission instructions, to a maximum power state, during which all of the emulation processor clusters intended to execute the mission instructions become operational, all in one system step. Such a load step within the emulation system may cause current to go from a low value to a high value, and it becomes difficult to hold a constant voltage for proper functioning of the emulation system.

An emulation system described herein may prevent an occurrence of a load step by continuously consuming power, even when mission cycles are not being executed by circuit components of the emulation system. The emulation system may include a compiler, which may generate one or more mission instructions, which may be transmitted to a cluster of emulation processors. The one or more mission instructions may instruct the cluster of emulation processors to perform particular computations or processes, indicate particular inputs for executing the one or more mission instructions, and specify a destination component of the emulation system (e.g., memory, another emulation processor). The emulation system may further include a pseudorandom logic circuit, which may be embedded as a hardware within the emulation system. The pseudorandom logic circuit may be embedded at any level, e.g., a P8 cluster level, a P64 cluster level, a P512 cluster level, and a chip level within the emulation system.

The pseudorandom logic circuit may generate one or more pseudorandom keephot instructions when mission cycles are not being executed by circuit components of the emulation system. The one or more pseudorandom keephot instructions may be statistically random and have a deterministic sequence. A portion in each of the one or more pseudorandom keephot instructions, which may change state elements during the execution of the one or more pseudorandom keephot instructions may be masked out. The pseudorandom logic circuit may generate these keephot instructions, which may be pseudorandom and not completely random as some bits within the keephot instructions may always be 0 because of being masked out. The pseudorandom logic circuit may transmit the one or more pseudorandom keephot instructions to the cluster of emulation processors.

A cluster of emulation processors may operate and execute various cycles, such as mission cycles, keephot cycles, etc. A timer circuit electrically coupled to the cluster of emulation processors may instruct one or more emulation processors within the cluster of emulation processors to execute the mission cycles and the keephot cycles based on a pre-determined logic or triggering conditions. During the mission cycles, the one or more emulation processors may receive and execute one or more mission instructions associated with an intended mission of a compiled procedure code. When the one or more emulation processors may execute the one or more mission instructions, it may cause the one or more emulation processors to consume power and generate useful computations. During the keephot cycles, the one or more emulation processors may receive and execute one or more pseudorandom keephot instructions to consume similar power while not executing the one or more mission instructions. When the one or more emulation processors execute the one or more pseudorandom keephot instructions, it may cause the one or more emulation processors to consume the power in order to mitigate the severity of a load step, but do not have an effect on computations, inputs, or outputs associated with the intended mission of the compiled procedure code.

An emulation system may operate in multiple modes to execute keephot cycles, while not executing one or more mission instructions, to consume power and not do any useful computations. In a first mode (mode0), a masking logic within a pseudorandom logic circuit embedded within the emulation system may mask out a portion of one or more mission instructions, which may change state elements or update memory of the emulation system during execution process, to generate one or more pseudorandom keephot instructions. When the one or more mission instructions are masked, value of certain bits within the one or more mission instructions may be changed or removed. In the first mode, the masking logic may further mask out a portion of one or more test instructions, which may change state elements or update memory of the emulation system during execution process, to generate the one or more pseudorandom keephot instructions. When the one or more test instructions are masked, value of certain bits within the one or more test instructions may be changed or removed. The first mode may be a default mode of operation of the emulation system. In a second mode (mode1), a combination of a linear shift feedback register and a random instruction generation within the pseudorandom logic circuit may randomly generate one or more instructions. The masking logic may mask out a portion of one or more randomly generated instructions, which may change state elements or update memory of the emulation system during execution process, to generate the one or more pseudorandom keephot instructions. When the one or more randomly generated instructions are masked, value of certain bits within the one or more randomly generated instructions may be changed or removed. When a cluster of emulation processors are not executing the one or more mission instructions, the cluster of emulation processors may receive and execute the one or more pseudorandom keephot instructions to consume power in order to mitigate the severity of a load step.

One or more components of an emulation system (e.g., chips, emulation processors, etc.) may generate and/or run keephot cycles that intentionally consume power in order to mitigate load steps. A keephot cycle consists of executing one or more pseudorandom keephot instructions a fixed number of times or a dynamically determined number of times under a control of one or more system circuits, such as a sequencer circuit that controls all cycles of the emulation system. In operation, whenever a cluster of emulation processors are not running mission cycles, and not done executing a compiled procedure code, the cluster of emulation processors may be instructed to execute the one or more pseudorandom keephot instructions during the keephot cycles, and thereby continue to consume power but not continue to execute the compiled procedure code.

Circuit components, such as a cluster of emulation processors, may execute any number of mission cycles, keephot cycles, etc., in order to keep an amount of current drawn by an emulation system roughly constant, and thereby avoiding any load steps. In some cases, the load step may be mitigated when the load step occurs in a gap between the mission cycles. In such cases, one or more pseudorandom keephot instructions executed during an intervening keephot cycle between two mission cycles may allow the power consumption to remain relatively constant without dropping too severely between the mission cycles. Additionally or alternatively, in some cases, the load step may be mitigated when the load step occurs prior to a first mission cycle, when a compiled procedure may be initially executed. By incrementing a number emulation processors or processor clusters executing the keephot cycles, the emulation system may incrementally increase the amount of power being consumed, and thereby mitigating the severity of the initial load step.

Figure 1:
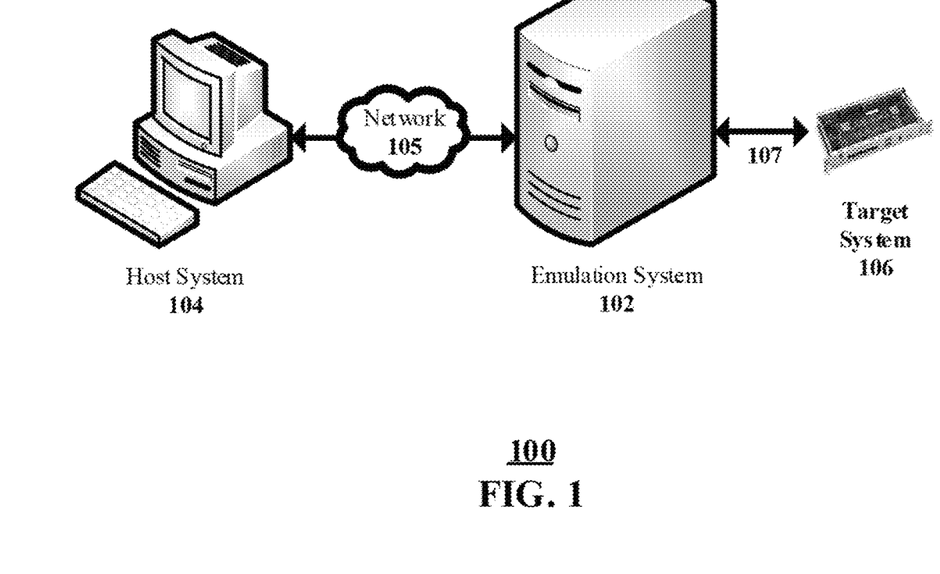
FIG. 1 shows an illustrative environment including an emulation system, according to an embodiment.

FIG. 1 shows an illustrative environment 100, which may include various components, such as an emulation system 102, a host system 104, a network 105, a target system 106, and a connection 107. The emulation system 102, the host system 104, and the target system 106 may be connected to each other via the network 105 and/or the connection 107.

The host system 104 may include one or more workstations that may run debug and runtime software that may interact with the emulation system 102. The host system 104 may include workstations that may be computing devices, such as desktop computers, laptop computers, tablet computers, and smartphones.

The emulation system 102 may include a combination of hardware and software modules that may emulate a design under test. The emulation system 102 may include clusters of interconnected application specific integrated circuits, non-transitory memory devices, buffers, data storage devices configured to provide a system platform for emulating the design under test. The clusters may be arranged in multiple boards. The boards may be arranged within multiple racks. Multiple racks may be arranged in a plurality of emulation devices, which may be analogous to multi-rack servers.

The target system 106 may include hardware and/or software modules configured to interact with the design under test being emulated. For example, if the design under test is a design of a graphics processing unit, the target system 106 may be analogous to a motherboard configured to receive the graphics processing unit after fabrication. The target system 106 may be an external hardware environment provided by a user.

The network 105 may be a communication link facilitating communication between the host system 104 and the emulation system 102. For example, the network 105 may be a local area network, a metropolitan area network, a wide area network, and/or Internet. The connection 107 may also be any kind of communication link configured to facilitate a communication with the emulation system 102 and the target system 106.

It should be understood that the above described systems 102, 104, 106 of the environment 100 are merely illustrative and other configuration should be considered to be within the scope of this disclosure. For example, the network 105 may include a local connection 107 or a combination of multiple local interconnects. In some embodiments, the systems 102, 104, 106 may be local and housed within the same building. In other embodiments, one or more of the systems 102, 104, 106 may be accessed remotely. For example, the host system 104 may remotely access the emulation system 102 through the network 105 using a remote access protocol, such as internet protocol.

Figure 2:
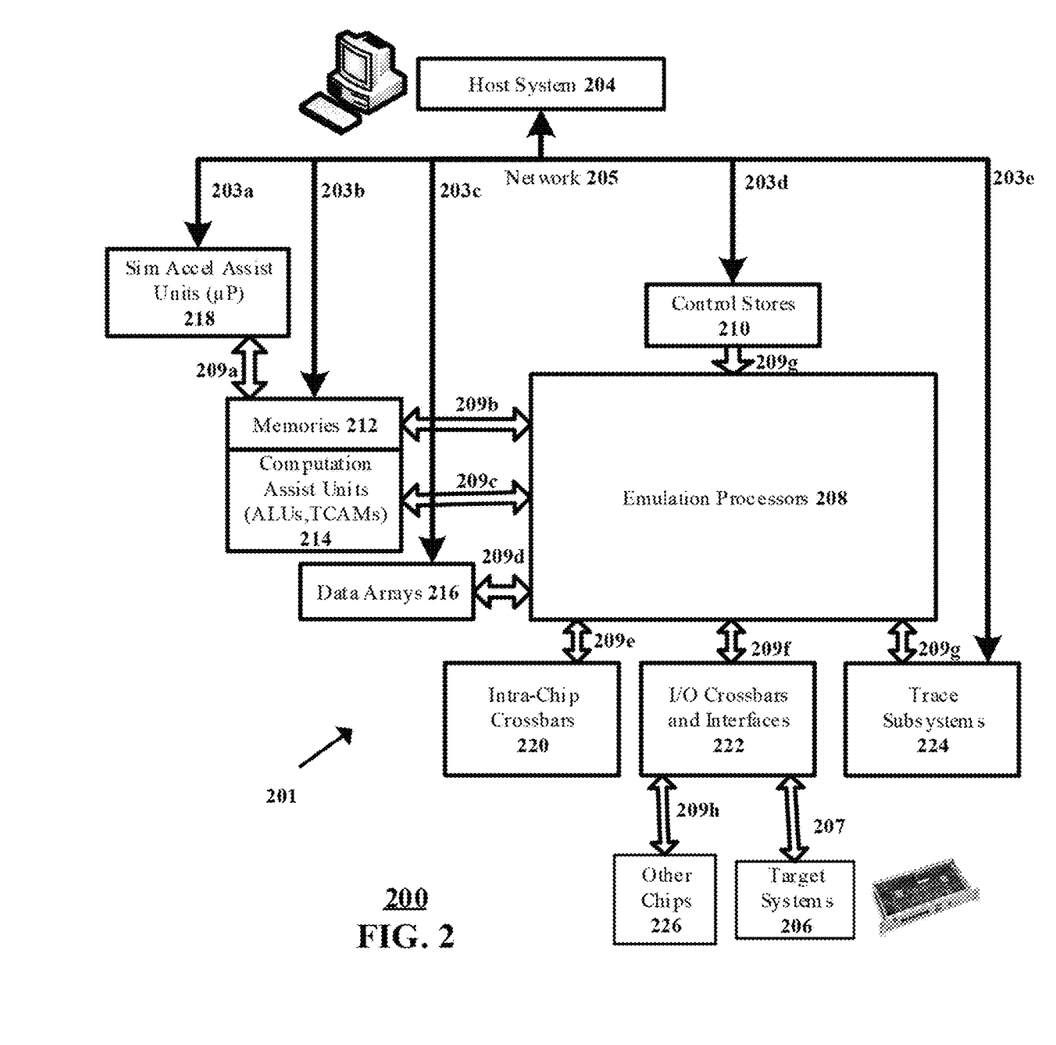
FIG. 2 shows an illustrative environment including an emulation processor, according to an embodiment.

FIG. 2 shows a more detailed view of the illustrative environment 200, particularly showing components within an application specific integrated circuit 201 of an emulation system (such as the emulation system 102 in FIG. 1). As shown, the application specific integrated circuit 201 may include emulation processors 208, control stores 210, memories 212, computation assist units 214, data arrays 216, simulation acceleration assist units 218, intra-chip crossbar 220, input/output (I/O) crossbars and interfaces 222, and trace subsystems 224. As shown, these components may be connected using interconnects 209a-209h. Furthermore, a network 205 (similar to the network 105 in FIG. 1) connecting the host system 204 (similar to the host system 104 in FIG. 1) with the application specific integrated circuit 201 may include interconnects 203a-203e.

Each application specific integrated circuit in the emulation system may contain a large number of emulation processors 208 (also referred to as Boolean processors). An emulation processor of the emulation processors 208 may be a computational unit configured to perform logic computation for the purpose of emulation, simulation, or prototyping of logic systems. The emulation processors 208 may include Boolean-processor-based systems, field programmable gate arrays, or the like. The emulation processors 208 may retrieve a program containing mission instructions from the control stores 210 and execute the program for one or more mission cycles. For a design under test, the program may be same for different mission cycles, and the data on which the program operates may change because of the change in the states of the design under test from one mission cycle to another. These states, representing the state of the design under tests state elements, intermediate combinational nodes, and states of design memories are stored by a cluster of emulation processors 208 (typically a cluster of 8 emulation processors 208) into data arrays 216. In some embodiments, the cluster of emulation processors 208 may store the states into other larger memories 212 that may include an internal memory and an external memory.

The application specific integrated circuit 201 may further include computation assist units 214 that the application specific integrated circuit 201 may use to model functions that may not be efficiently handled by general-purpose bitwise processors and generic memories. The computation assist units 214 may include hardware structures to perform arithmetic operations (ALUs) and to emulate ternary content-addressable memories (TCAMs). The application specific integrated circuit 201 may also include simulation acceleration assistance units 218, which may be embedded microprocessors that may provide a capability for local processing of simulation acceleration or analysis tasks. The local processing of a simulation acceleration unit may be implemented along with any other simulation acceleration at the host system 204.

Intra-chip crossbars 202 may provide an interface for the emulation processors 208 to interact with other processors in other application specific integrated circuits (not shown). The I/O crossbars and interfaces 222 may provide an interface for the application specific integrated circuit 201 to interact with the target systems 206 (similar to the target system 106 in FIG. 1) or other external chips 226. The target systems 206 and the external chips 226 may provide an external hardware environment for the design under test being emulated by the emulation system. The target systems 206 may be connected to the application specific integrated circuit 201 using a connection 207 (similar to the connection 107 in FIG. 1). The trace subsystems 224 may collect and/or store signals generated in the application specific integrated circuit 201 (or the emulation system in general) during the execution of the design under test. The trace subsystems 224 may function in accordance with compiler, and runtime or offline debug code to collect and store the signals. The trace subsystems 224 may support two modes of operations: (i) dynamic probes, which may allow a set of user-specified probes with deep traces; and (ii) full vision, which may allow reconstruction of all user signals without user specification and without performance impact.

Figure 3:
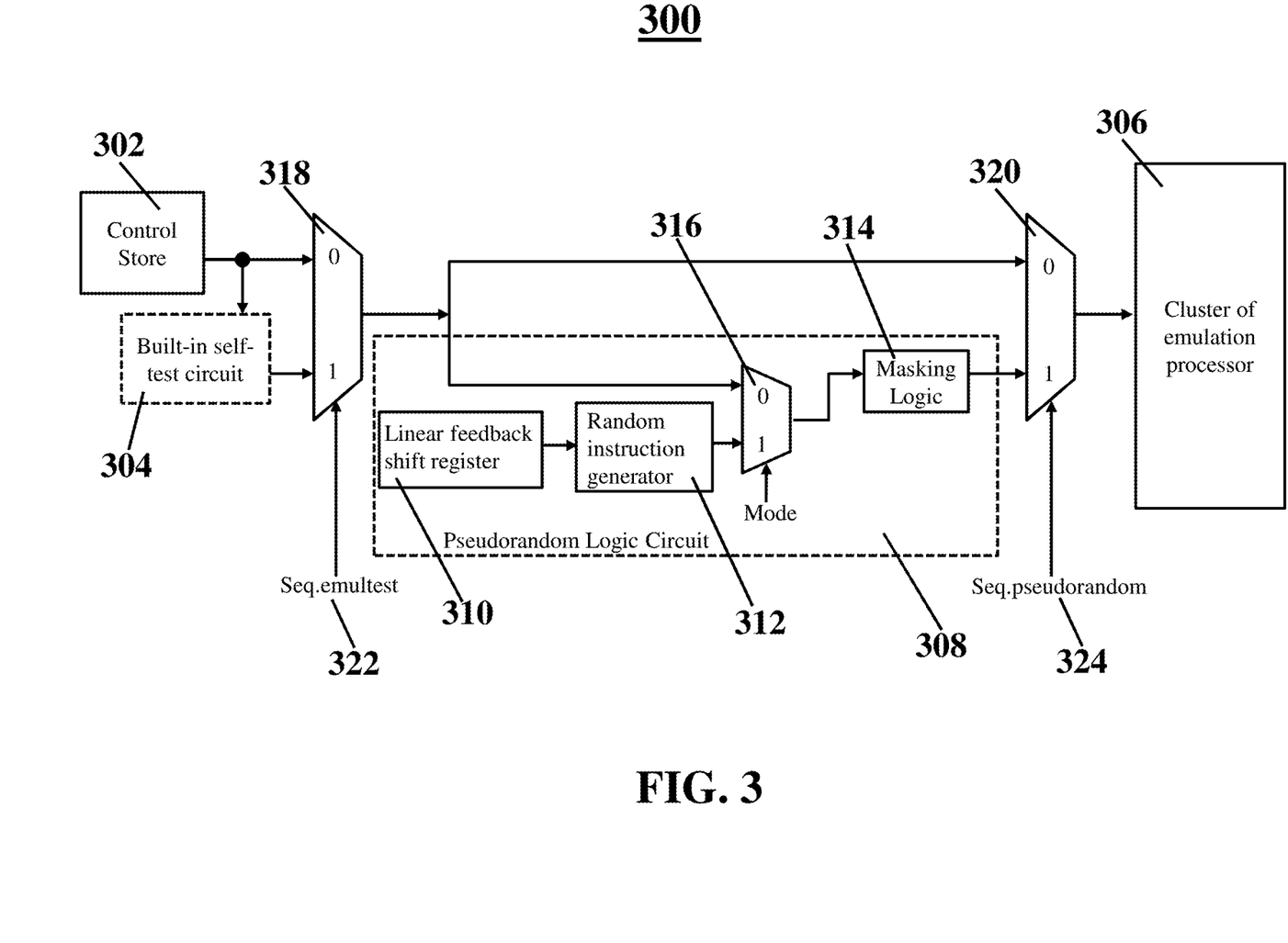
FIG. 3 shows a functional block diagram of an emulation system having a pseudorandom keephot instructions generator, according to an embodiment.

FIG. 3 shows a functional block diagram of an emulation system 300. The emulation system 300 may include a pseudorandom keephot instructions generator, which may include various logic circuits and components to generate one or more pseudorandom keephot instructions, which may be executed to consume power, but not do any useful computations.

The emulation system 300 may include a control store 302, a built-in self-test circuit 304, a cluster of emulation processors 306, and a pseudorandom logic circuit 308. The pseudorandom logic circuit 308 may include a linear feedback shift register 310, a random instruction generator 312, a masking logic 314, and a first selector logic 316. The control store 302, the built-in self-test circuit 304, and the cluster of emulation processors 306 may be electrically connected to each other. The pseudorandom logic circuit 308 may be electrically connected to the control store 302, the built-in self-test circuit 304, and the cluster of emulation processors 306.

A control store 302 may be a non-transitory storage medium. The control store 302 may include one or more mission instructions to be executed by the cluster of emulation processors 306. The one or more mission instructions may instruct the cluster of emulation processors 306 to perform particular computations or processes, indicate particular inputs for executing the one or more mission instructions, and specify a destination component (e.g., memory, another emulation processor) of the emulation system 300. The cluster of emulation processors 306 may retrieve a program containing the one or more mission instructions from the control store 302, and execute the program for one or more mission cycles.

The control store 302 may be electrically connected to a second selector logic 318, which may be electrically connected to the pseudorandom logic circuit 308. The second selector logic 318 may be a multiplexer. The second selector logic 318 may select the one or more mission instructions from the control store 302 for transmission to the pseudorandom logic circuit 308 when a corresponding bit of a first instruction (e.g., a seq.emultest instruction) 322 is 0 (e.g., during mission cycles). The second selector logic 318 may also select the one or more mission instructions from the control store 302 for transmission to a third selector logic 320 when the corresponding bit of the first instruction 322 is 0.

A built-in self-test circuit 304 may generate one or more test instructions based upon the one or more mission instructions from the control store 302. The one or more test instructions may be one or more pseudorandom self-test instructions. The built-in self-test circuit 304 may be electrically connected to the second selector logic 318, which may be electrically connected to the pseudorandom logic circuit 308. The second selector logic 318 may select the one or more test instructions from the built-in self-test circuit 304 for transmission to the pseudorandom logic circuit 308 when a corresponding bit of the first instruction 322 is 1 (e.g., during test cycles). The second selector logic 318 may also select the one or more test instructions from the built-in self-test circuit 304 for transmission to the third selector logic 320 when the corresponding bit of the first instruction 322 is 1.

A linear feedback shift register 310 may be implemented in hardware within the emulation system 300. The linear feedback shift register 310 may be a shift register whose input bit is an output of a linear function of one or more of its previous states. The linear function of single bits may be an exclusive-or (XOR). An initial input value of the linear feedback shift register 310 may be called a seed, and because the operation of the linear feedback shift register 310 may be deterministic, a stream of values produced by the linear feedback shift register 310 may be completely determined by its current (or previous) state. The linear feedback shift register 310 may have a finite number of possible states, and for that reason the linear feedback shift register 310 may eventually enter a repeating cycle. The linear feedback shift register 310 with a predetermined feedback function may produce a sequence of bits, which may appear random and may have a very long cycle or period.

A random instruction generator 312 may include a randomizer circuit. The random instruction generator 312 may be electrically connected to the linear feedback shift register 310. The random instruction generator 312 may determine a state or a value associated with the linear feedback shift register 310. The random instruction generator 312 may generate one or more random instructions based upon the value or the state associated with the linear feedback shift register.

The random instruction generator 312 may be electrically connected to the first selector logic 316, which may be electrically connected to the masking logic 314. The first selector logic 316 may be a multiplexer. The first selector logic 316 may receive the one or more mission instructions from the control store 302 or the one or more test instructions from the built-in self-test circuit 304. The first selector logic 316 may select the one or more mission instructions received from the control store 302 or the one or more test instructions received from the built-in self-test circuit 304 for transmission to the masking logic 314 during a first mode (mode0) of operation. The first mode of operation may be between mission cycles of the emulation system 300. The first selector logic 316 may receive the one or more random instructions from the random instruction generator 312. The first selector logic 316 may select the one or more random instructions generated by the random instruction generator 312 for transmission to the masking logic 314 during a second mode of operation (mode1). The second mode of operation may be between test cycles of the emulation system 300.

A masking logic 314 may include an electronic masking circuit. The masking logic 314 may receive the one or more mission instructions via the first selector logic 316 during the first mode. The masking logic 314 may process the one or more mission instructions to mask one or more bits from the one or more mission instructions. The masking logic 314 may mask the one or more bits from the one or more mission instructions to avoid changing any state values or updating state elements when the cluster of emulation processors 306 may execute a masked version of the one or more mission instructions. The state elements may include a data array, an internal memory, and an external memory of the emulation system 300. The masking logic 314 may generate one or more pseudorandom keephot instructions, which may correspond to the masked version of the one or more mission instructions. The one or more pseudorandom keephot instructions may be forced to either 0's or 1's.

The masking logic 314 may receive the one or more test instructions via the first selector logic 316 during the first mode. The masking logic 314 may process the one or more test instructions to mask one or more bits from the one or more test instructions. The masking logic 314 may mask the one or more bits from the one or more test instructions to avoid changing any state values or updating state elements when the cluster of emulation processors 306 may execute a masked version of the one or more test instructions. The masking logic 314 may generate one or more pseudorandom keephot instructions, which may correspond to the masked version of the one or more test instructions.

The masking logic 314 may receive the one or more random instructions via the first selector logic 316 during the second mode. The masking logic 314 may process the one or more random instructions to mask one or more bits from the one or more random instructions. The masking logic 314 may mask the one or more bits from the one or more random instructions to avoid changing any state values or updating state elements when the cluster of emulation processors 306 may execute a masked version of the one or more random instructions. The masking logic 314 may generate one or more pseudorandom keephot instructions, which may correspond to the masked version of the one or more random instructions.

The masking logic 314 may use information logic to perform masking operations and generate pseudorandom keephot instructions, which may correspond to masked version of instructions, such as mission instructions. The information logic may depict one or more field values within control store word fields of the instructions, which may be forced with new values using the masking logic 314.

The masking logic 314 may mask the one or more bits from the one or more random or other instructions and force the one or more bits with the new values. The presence of the forced new values in the masked version of the one or more random or other instructions may prevent any change in the state values or update of memories when the cluster of emulation processors 306 may execute the masked version of the one or more random or other instructions.

The masking logic 314 may transmit the one or more pseudorandom keephot instructions to the cluster of emulation processors 306, which may execute the one or more pseudorandom keephot instructions to enable the emulation system 300 to continue running and consume a certain amount of power such that there are no load steps when the one or more mission instructions are executed. The execution of the one or more pseudorandom keephot instructions during non-mission cycles period may avoid a situation when the emulation system 300 may go immediately from an idle state to a fully running state. When the cluster of emulation processors 306 may execute the one or more pseudorandom keephot instructions, the one or more pseudorandom keephot instructions may not perform any functional operation, e.g., change values in a memory of the emulation system 300.

The masking logic 314 may be electrically connected to the third selector logic 320, which may be electrically connected to the cluster of emulation processors 306. The third selector logic 320 may be a multiplexer. The third selector logic 320 may receive the one or more mission instructions from the control store 302 or the one or more test instructions from the built-in self-test circuit 304 via the second selector logic 318. The third selector logic 320 may select the one or more mission instructions or the one or more test instructions for transmission to the cluster of emulation processors 306 when a corresponding bit of a second instruction (e.g., a seq.pseudorandom instruction) 324 is 0 (e.g., during mission/test cycles). The third selector logic 320 may receive the one or more pseudorandom keephot instructions via the masking logic 314. The third selector logic 320 may select the one or more pseudorandom keephot instructions for transmission to the cluster of emulation processors 306 when a corresponding bit of the second instruction 324 is 1 (e.g., during keephot cycles).

The cluster of emulation processors 306 may receive the one or more mission instructions via the third selector logic 320 when the corresponding bit of the second instruction 324 is 0. The cluster of emulation processors 306 may execute the one or more mission instructions for the one or more mission cycles. The one or more mission instructions may be associated with an intended mission of a compiled procedure code. The one or more mission instructions may instruct the cluster of emulation processors 306 to perform specific computations or processes, indicate specific inputs for executing the one or more mission instructions, and specify a destination component (e.g., memory, another emulation processor) of the emulation system 300. When the cluster of emulation processors 306 may execute the one or more mission instructions, the cluster of emulation processors 306 may perform useful computations.

The cluster of emulation processors 306 may receive the one or more test instructions via the third selector logic 320 when the corresponding bit of the second instruction 324 is 0. The cluster of emulation processors 306 may execute the one or more test instructions for the one or more test cycles. The one test instructions may be pseudorandom but the one or more test instructions may cause one or more emulation processors within cluster of emulation processors 306 to generate one or more deterministic outputs such that a testing processor may compare the one or more deterministic outputs to detect a faulty emulation processor, a faulty emulation processor cluster, or a faulty emulation chip of the emulation system 300.

The cluster of emulation processors 306 may receive the one or more pseudorandom keephot instructions via the third selector logic 320 when the corresponding bit of the second instruction 324 is 1. The cluster of emulation processors 306 may execute the one or more pseudorandom keephot instructions for the one or more keephot cycles to perform keephot computations. The cluster of emulation processors 306 may execute the one or more one or more pseudorandom keephot instructions to consume power during operation, but not do any useful computations. The cluster of emulation processors 306 may run the one or more keephot cycles to continuously consume power when the one or more mission or other cycles are not being executed so that an amount of power consumed mitigates the amount of power-load drop and power-load rise when the one or more mission or other cycles end or begin in the emulation system 300.

The emulation system 300 may include a sequencer. The sequencer may provide timing information to the emulation system 300. The sequencer may be configured to run and/or execute the one or more keephot cycles in addition to the one or more mission and other cycles, such as test cycles. The emulation system 300 may be configured such that the one or more keephot cycles may be reserved, and when the sequencer may execute the one or more keephot cycles, then the one or more mission or other cycles may not be executed by the sequencer. At a given time, the sequencer may either run the one or more mission cycles configured to result in useful computations when the cluster of emulation processors 306 may execute the one or more mission instructions or run the one or more keephot cycles resulting is non-useful computations when the cluster of emulation processors 306 may execute the one or more pseudorandom keephot instructions. The sequencer may be programmed to selectively run the one or more mission cycles or the one or more keephot cycles based on an input signal received or logic programmed into the sequencer to determine a time to run the one or more mission cycles resulting in useful computations when the cluster of emulation processors 306 may execute the one or more mission instructions or the one or more keephot cycles resulting is non-useful computations when the cluster of emulation processors 306 may execute the one or more pseudorandom keephot instructions. The sequencer may run the one or more mission cycles, the one or more keephot cycles, and other cycles such that execution by the cluster of emulation processors 306 of each mission instruction, pseudorandom keephot instruction, or other instruction may consumer similar power although the execution of the one or more mission instructions may result in useful computations and the execution of the one or more pseudorandom keephot instructions may result is non-useful computations.

The emulation system 300 may include the pseudorandom logic circuit 308, which may be configured for operating with a P8 emulation processor within the cluster of emulation processors 306. In some embodiments, the pseudorandom logic circuit 308 may be configured for operating with a P64 emulation processor or a P512 emulation processor rather than the P8 emulation processor within the cluster of emulation processors 306. Each P8 emulation processor of the emulation system 300 may include a same pseudorandom logic circuit 308. The P8 emulation processors may be sequentially powered up and activated one at a time, rather than all at once, such that power may ramp up gradually in the emulation system 300 across cycles. To activate particular P8 emulation processors one or a few at a time, a load step may be divided into a plurality of predetermined load jumps where the number of predetermined load jumps within the load step may correspond to the number of P8 emulation processors to be activated. This may allow different portions of an emulation chip of the emulation system 300 to be powered on at different times such that there is a slow, manageable power build-up as opposed to switching the entire emulation chip of the emulation system 300 on at once.

To enable sequential power up of the cluster of emulation processors 306, the sequencer may provide commands to each P8 emulation processor within the cluster of emulation processors 306 to operate on the one or more pseudorandom keephot instructions for the one or more keephot cycles being received by the sequencer. In this situation, such each P8 emulation processor when going through a motion of the one or more pseudorandom keephot instructions for the one or more keephot cycles being run by the sequencer, each P8 emulation processor may operate on the one or more pseudorandom keephot instructions. Because different clusters are not synchronized, each P8 emulation processor may be turned on at any point of time. Also, because the pseudorandom keephot instructions are for the one or more keephot cycles and no useful computation is being executed, each P8 emulation processor may be turned on randomly and in no specific order but at a slow speed. Accordingly, the time at which each P8 emulation processor may be activated does not matter. In alternate embodiments, the emulation system 300 may be configured to randomly turn on each P64 or each P512 emulation processor and in no specific order but at a slow speed. The ramping of the power consumption in the emulation system 300 is slow enough so that a voltage regulator module of the emulation system 300 can compensate. The voltage regulator module may hold a constant voltage, causing the voltage to drop as a function of the current in components of the emulation system 300. Accordingly, the ramping of the power is done such that the voltage regulator module has appropriate time to adjust to the new load before any more ramping up of the power is done. Each step of the ramping up of power is set to be longer than a time constant of the voltage regulator module. In some embodiments, the cluster of emulation processors 306 may receive and execute the one or more mission instructions.

The one or more mission instructions may instruct the cluster of emulation processors 306 to perform particular computations or processes, indicate particular inputs for executing the one or more mission instructions, and specify a destination component of the emulation system 300 (e.g., a memory). The random instruction generator 312 may randomly select instructions from the one or more mission instructions. The random instruction generator 312 may directly or via the masking logic 314 may mask out a portion of the one or more mission instructions, which may change state elements or update memory of the emulation system 300 during execution process, to generate one or more keephot instructions. When the one or more mission instructions are masked, value of certain bits within the one or more mission instructions may be changed or removed. When the cluster of emulation processors 306 are not executing the one or more mission instructions, the cluster of emulation processors 306 may receive and execute the one or more keephot instructions to consume power in order to mitigate the severity of a load step. When the cluster of emulation processors 306 may execute the one or more keephot instructions, the one or more keephot instructions may not perform any functional operation, e.g., change values in the memory of the emulation system 300.

Figure 4:
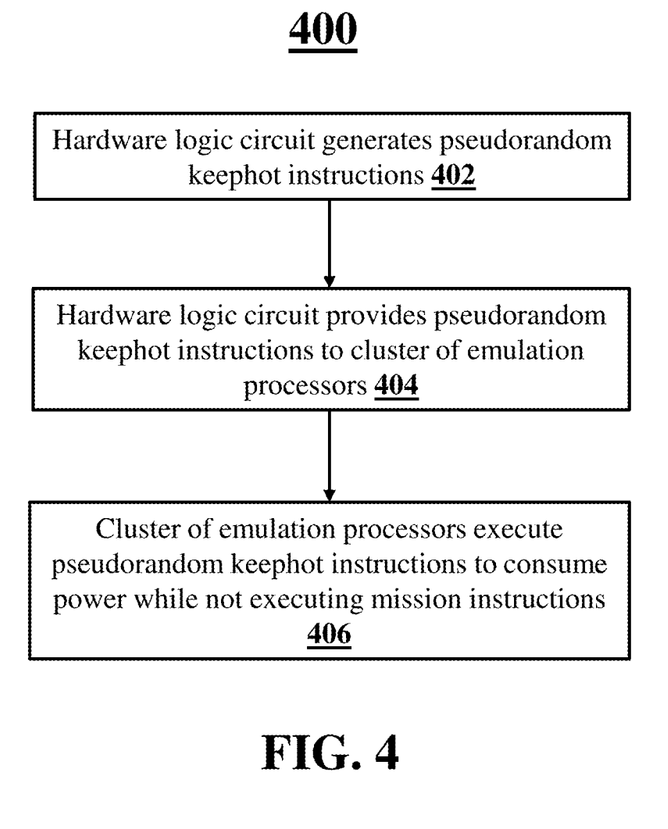
FIG. 4 shows a flow diagram of a method of mitigating large load steps during emulation utilizing pseudorandom keephot instructions, according to an embodiment.

FIG. 4 shows execution steps for mitigating large load steps during emulation utilizing pseudorandom keephot instructions, according to a method 400. The method 400 includes execution steps 402, 404, and 406. It should be understood that the steps described herein are merely illustrative and additional or substitute steps should also be considered to be within the scope of this disclosure. Furthermore, methods with a fewer numbers of steps should also be considered to be within the scope of this disclosure. One or more components of an emulation system may perform different steps of the method 400.

At step 402, a hardware logic circuit of the emulation system may generate one or more pseudorandom keephot instructions. The hardware logic circuit may be a pseudorandom logic circuit. The pseudorandom logic circuit may at least include a linear feedback shift register and a random instruction generator. The random instruction generator may generate the one or more pseudorandom keephot instructions based on an input value associated with the linear feedback shift register. The pseudorandom logic circuit may further include a masking logic. The masking logic may receive the one or more pseudorandom keephot instructions from the random instruction generator. The masking logic may process the one or more pseudorandom keephot instructions to mask a subset of bits in each of the one or more pseudorandom keephot instructions. The masking of the subset of bits within the one or more pseudorandom keephot instructions may prevent one or more updates to one or more state elements of the emulation system during execution of the one or more pseudorandom keephot instructions.

At step 404, the hardware logic circuit electrically coupled to a cluster of emulation processors of a hardware emulator may transmit the one or more pseudorandom keephot instructions to the cluster of emulation processors. The cluster of emulation processors may receive the one or more pseudorandom keephot instructions.

At step 406, one or more emulation processors within the cluster of emulation processors may execute one or more mission instructions during mission cycles. The one or more mission instructions may be associated with an intended mission of a compiled procedure code to perform functional operation and do useful computations. When the one or more emulation processors may not be executing one or more mission instructions, the one or more emulation processors may receive and execute the one or more pseudorandom keephot instructions to consume power, but not do any functional operation and useful computations.

Figure 5:
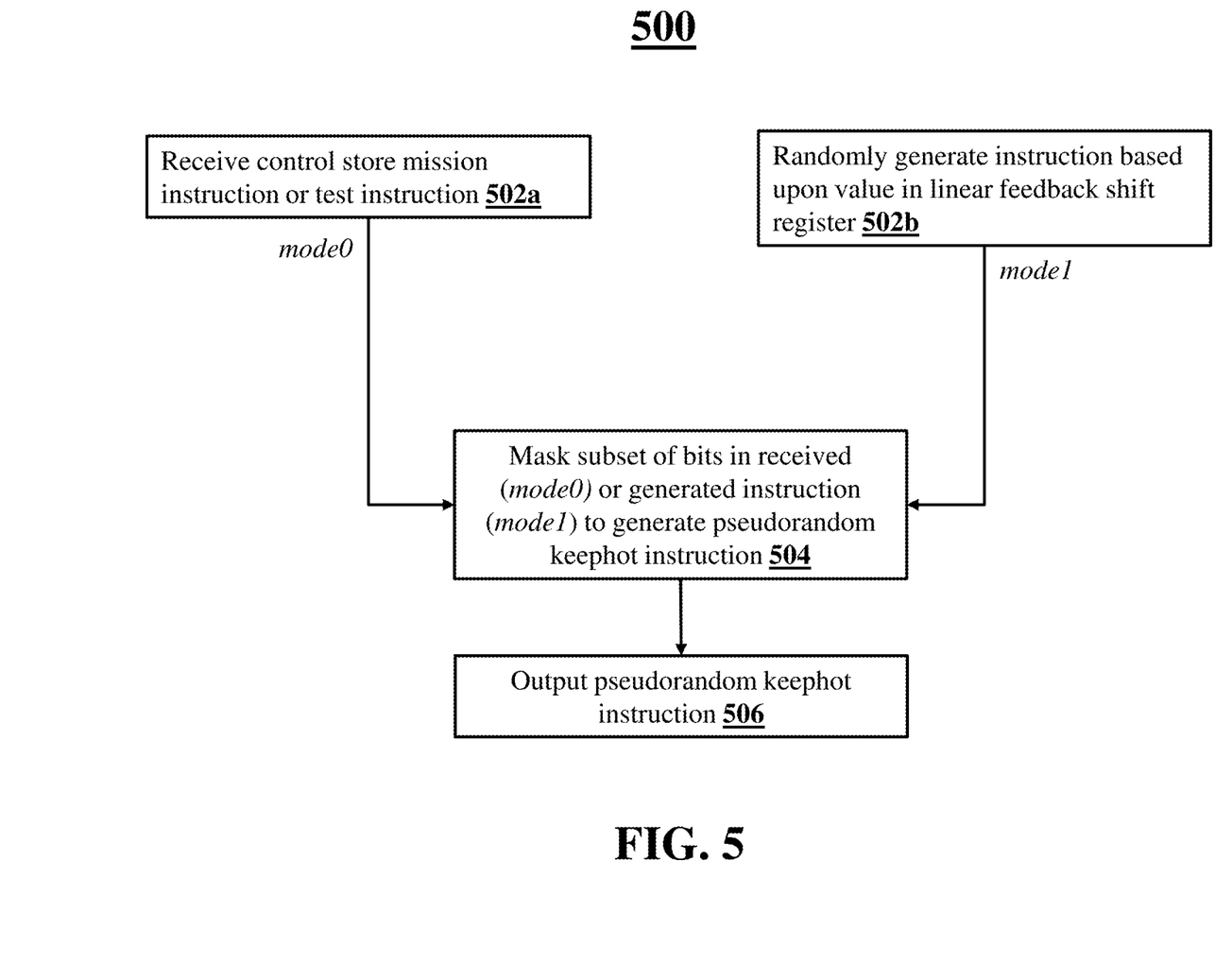
FIG. 5 shows a flow diagram of a method of generating pseudorandom keephot instructions in two modes, according to an embodiment.

FIG. 5 shows execution steps for generating pseudorandom instructions in two modes of operation of a hardware logic circuit, according to a method 500. The two modes may include a first mode (mode0) of operation of the hardware logic circuit and a second mode (mode1) of operation of the hardware logic circuit. The first mode may be a default mode and executed between mission cycles. The second mode may be executed in between test cycles.

The method 500 includes execution steps 502a, 502b, 504, and 506. It should be understood that the steps described herein are merely illustrative and additional or substitute steps should also be considered to be within the scope of this disclosure. Furthermore, methods with a fewer numbers of steps should also be considered to be within the scope of this disclosure. One or more components of an emulation system may perform different steps of the method 500.

At step 502a, a selector logic may select the first mode of operation of the hardware logic circuit. A pseudorandom logic circuit electrically coupled to a cluster of emulation processors may receive one or more mission instructions from a control store electrically coupled to the cluster of emulation processors. The pseudorandom logic circuit may also receive one or more test instructions from a built-in self-test circuit electrically coupled to the cluster of emulation processors.

At step 502b, the selector logic may select the second mode of operation of the hardware logic circuit. A random instructor generator electrically coupled to a linear feedback shift register of the pseudorandom logic circuit may generate one or more random instructions based upon a value associated with the linear feedback shift register.

At step 504, a masking logic of the pseudorandom logic circuit may receive the one or more mission instructions during the first mode. The masking logic may process the one or more mission instructions to mask a subset of bits from the one or more mission instructions and generate one or more pseudorandom keephot instructions. The one or more pseudorandom keephot instructions may include a masked version of the one or more mission instructions. The masking of the subset of bits within the one or more mission instructions may prevent one or more updates to one or more state elements during execution of the one or more pseudorandom keephot instructions.

The masking logic may receive the one or more test instructions during the first mode. The masking logic may process the one or more test instructions to mask a subset of bits from the one or more test instructions and generate one or more pseudorandom keephot instructions. The one or more pseudorandom keephot instructions may include a masked version of the one or more test instructions. The masking of the subset of bits within the one or more test instructions may prevent one or more updates to one or more state elements during execution of the one or more pseudorandom keephot instructions.

The masking logic may receive the one or more random instructions during the second mode. The masking logic may process the one or more random instructions to mask a subset of bits from the one or more random instructions and generate one or more pseudorandom keephot instructions. The one or more pseudorandom keephot instructions may include a masked version of the one or more random instructions. The masking of the subset of bits within the one or more random instructions may prevent one or more updates to one or more state elements during execution of the one or more pseudorandom keephot instructions.

At step 506, the pseudorandom logic circuit may transmit the one or more pseudorandom keephot instructions to the cluster of emulation processors. The cluster of emulation processors may receive the one or more pseudorandom keephot instructions. One or more emulation processors within the cluster of emulation processors may execute the one or more pseudorandom keephot instructions to consume power, but not do any functional operation and useful computations when the one or more emulation processors may not be executing one or more mission or other instructions.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An emulation system comprising:
   a cluster of emulation processors;
   a hardware logic circuit electrically coupled to the cluster of emulation processors and configured to generate a plurality of pseudorandom keephot instructions, each having a set of pseudorandom bits; and
   the cluster of emulation processors configured to execute the plurality of pseudorandom keephot instructions to consume power while not executing mission instructions.

2. The emulation system of claim 1, wherein the hardware logic circuit comprises a linear feedback shift register.

3. The emulation system of claim 2, wherein the hardware logic circuit further comprises:
   a masking logic configured to mask a subset of bits in each of the plurality of pseudorandom keephot instructions.

4. The emulation system of claim 3, wherein the masking of the subset of bits prevents updates to state elements during the execution of the plurality of pseudorandom keephot instructions.

5. The emulation system of claim 4, wherein the hardware logic circuit in a first mode of operation is configured to:
   select an instruction from a non-transitory storage medium electrically coupled to the cluster of emulation processors to be provided to the masking logic for masking a subset of bits from the instruction to generate at least one of the plurality of pseudorandom keephot instructions.

6. The emulation system of claim 5, wherein the first mode of operation is executed between emulation cycles.

7. The emulation system of claim 6, wherein the first mode of operation is a default mode.

8. The emulation system of claim 5, further comprising:
   a random instruction generator configured to generate a random instruction based upon a value of the linear feedback shift register.

9. The emulation system of claim 8, wherein the hardware logic circuit in a second mode of operation is configured to:
   select the random instruction generated by the random instruction generator to be provided to the masking logic for masking a subset of bits from the random instruction to generate at least one of the plurality of pseudorandom keephot instructions.

10. The emulation system of claim 9, wherein the second mode of operation is executed in between test cycles.

11. A method for mitigating large load steps during emulation, the method comprising:
    generating, by a hardware logic circuit electrically coupled to a cluster of emulation processors of a hardware emulator, a plurality of pseudorandom keephot instructions, each having a set of pseudorandom bits; and
    executing, by the cluster of emulation processors, the plurality of pseudorandom keephot instructions to consume power while not executing mission instructions.

12. The method of claim 11, wherein the hardware logic circuit comprises a linear feedback shift register.

13. The method of claim 12, further comprising:
    masking, by a masking logic in the hardware logic circuit, a subset of bits in each of the plurality of pseudorandom keephot instructions.

14. The method of claim 13, wherein the masking of the subset of bits prevents updates to state elements during the execution of the plurality of pseudorandom keephot instructions.

15. The method of claim 14, further comprising:
    selecting, by the hardware logic circuit in a first mode of operation, an instruction from a non-transitory storage medium electrically coupled to the cluster of emulation processors to be provided to the masking logic for masking a subset of bits from the instruction to generate at least one of the plurality of pseudorandom keephot instructions.

16. The method of claim 15, wherein the first mode of operation is executed between emulation cycles, and wherein the first mode of operation is a default mode.

17. The method of claim 15, further comprising:
generating, by a random instruction generator electrically coupled to the linear feedback shift register, a random instruction based upon a value of the linear feedback shift register.

18. The method of claim 17, further comprising:
selecting, by the hardware logic circuit in a second mode of operation, the random instruction generated by the random instruction generator to be provided to the masking logic for masking a subset of bits from the random instruction to generate at least one of the plurality of pseudorandom keephot instructions.

19. An emulation system comprising:
a control store comprising a plurality of mission instructions;
a cluster of emulation processors associated with the control store and configured to execute the plurality of mission instructions;
a random instruction generator associated with the control store and the cluster of emulation processors, wherein the random instruction generator is configured to randomly select one or more mission instructions from the plurality of mission instructions and mask the one or more mission instructions to generate one or more keephot instructions; and
the cluster of emulation processors configured to execute the one or more keephot instructions to consume power while not executing the plurality of mission instructions.

20. The emulation system of claim 19, wherein the random instruction generator is configured to mask a portion of the one or more mission instructions, and wherein the masking of the portion prevents updates to state elements during the execution of the one or more keephot instructions.

* * * * *